A. H. KINDER.
WEATHER SHIELD FOR VEHICLES.
APPLICATION FILED MAR. 22, 1916.
1,284,366.
Patented Nov. 12, 1918.
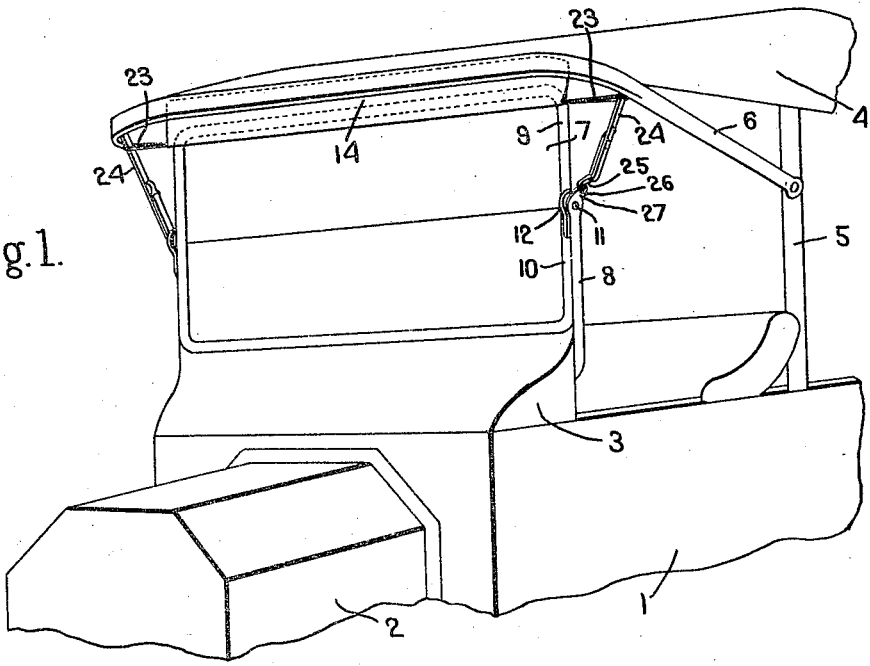
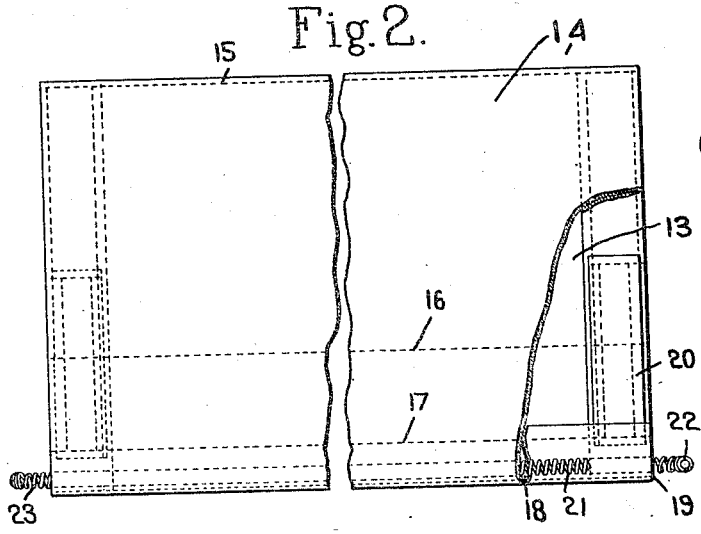
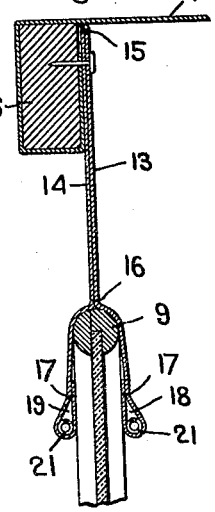
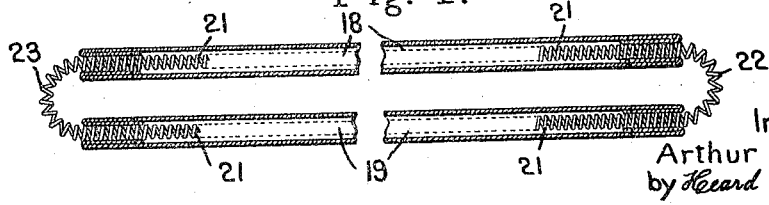
Inventor.
Arthur H. Kinder,
by Heard Smith & Tennant.
Attys.

UNITED STATES PATENT OFFICE.

ARTHUR H. KINDER, OF DORCHESTER, MASSACHUSETTS, ASSIGNOR TO L. C. CHASE & COMPANY, OF BOSTON, MASSACHUSETTS, A FIRM.

WEATHER-SHIELD FOR VEHICLES.

1,284,366.  Specification of Letters Patent.  Patented Nov. 12, 1918.

Application filed March 22, 1916. Serial No. 86,025.

*To all whom it may concern:*

Be it known that I, ARTHUR H. KINDER, a citizen of the United States, and resident of Dorchester, county of Suffolk, State of Massachusetts, have invented an Improvement in Weather-Shields for Vehicles, of which the following description, in connection with the accompanying drawing, is a specification, like characters on the drawing representing like parts.

This invention relates to improvements in weather shields for vehicles having a top and a transparent wind shield adapted to close the front opening between said top and the body or the cowl of the vehicle, being particularly adapted for use in connection with certain types of automobiles such as the Ford.

Certain types of vehicles and particularly automobiles having foldable tops are provided with transparent wind shields secured to the dash or cowl of the vehicle, said wind shields extending upwardly either in a vertical or inclined position nearly to the top but terminating a sufficient distance therefrom to leave a considerable space through which the air may enter the vehicle. In certain machines the construction is such that it is impossible to extend the wind shield to a sufficient height to close this opening without interfering with the folding of the top.

The object of the present invention is to provide a weather shield which may be conveniently attached to vehicles of usual construction and which will effectively close this undesirable opening.

In a weather shield of this character means must be provided for retaining the lower edge of the weather shield closely in engagement with the top of the wind shield but there must be a sufficient amount of flexibility between the wind shield and the supporting parts to permit vibration of the top due to the jolting of the vehicle without displacement of the weather shield.

This is accomplished in the preferred form of the invention disclosed herein by providing a weather shield of flexible material which is secured to the front bow of the top. The lower edge thereof is preferably provided with means to embrace the upper portion of the wind shield and with laterally extending resilient members adapted to engage conveniently located stays upon the wind shield frame or its support, preferably the usual stays which extend from the top to the standards which support the wind shield.

The present invention is illustrated in the accompanying drawings as applied to an automobile of a usual type;

In the drawings;

Figure 1 is a perspective view of a portion of the front end of an automobile with this invention embodied therein, Fig. 2 is a front view centrally broken away of a preferred form of weather shield embodying my invention, a portion of one of the flaps of the wind shield being broken away to show the interior construction, Fig. 3 is a detail vertical sectional view of the wind shield illustrated in Fig. 2 showing the same as applied to the front bow of the top and to the upper edge of a wind shield, and, Fig. 4 is a horizontal sectional view through the flaps which are adapted to embrace the wind shield showing a preferred form of resilient means inclosed therein for securing the weather shield to rigidly anchored braces.

The portion of the automobile illustrated in the accompanying drawings comprises a body 1 having a forwardly extending hood 2, a cowl 3, a top 4 supported upon the usual braces 5 and having the usual bows, the front bow 6 of which is illustrated, and the transparent wind shield 7 supported upon the usual standards 8 which are secured to the body of the cowl.

The wind shield illustrated herein is made in two parts the outer edges of which are respectively surrounded by metallic frames 9 and 10, said frames being pivoted upon common pivots 11 located at or near the top of the standards 8, suitable terminal members 12 being provided to permit the members of the wind shield to be retained in any desired position of adjustment.

It will be noted that there is a considerable distance between the upper edge of the wind shield and the under face of the top so that when the machine is in motion a considerable current of air enters the machine in the face of the passengers.

The object of the present invention is to provide means for closing this space thereby adding to the comfort of the passengers in the vehicle. In the preferred form of my invention this is accomplished by providing a strip of flexible material extending preferably the full width of the wind shield and suitably secured at its upper edge to the top and at its lower edge to the upper portion of the wind shield.

By reason of the fact that there is always more or less lateral movement between the top and the wind shield due to the vibration of the top caused by the jolting of the vehicle it is necessary that the connection between the flexible weather shield and the wind shield shall be of a resilient character and the mechanism disclosed herein comprises a preferred form for thus yieldably securing the weather shield in proper relation to the upper portion of the wind shield.

The preferred form of weather strip which is illustrated herein comprises a strip of flexible material such as leather, rubber or other light material folded longitudinally to present two overlying flaps 13 and 14 which preferably are secured together by a line of stitching 15 adjacent the fold and another line of stitching 16 at a short distance, preferably about two or three inches from the lower edge of the strip so as to provide a bifurcated lower edge adapted to embrace the frame 9 of the upper portion of the wind shield. The lower edges of the flaps 13, 14 are bent inwardly and preferably secured together by lines of stitching 17 to form hems 18 and 19 extending longitudinally of the flaps, reinforcing strips 20 being attached to the edges of the ends of the flaps and to the body thereof in order more securely to fasten the flaps together and also to strengthen the same at the points of greatest strain.

These hems 19, 20 may conveniently comprise means for holding a resilient member or members adapted to be secured to rigid lips connected to the top or to the wind shield standard or connecting the top and wind shield standard.

In the preferred embodiment of the invention herein the resilient member is in the form of an endless spiral spring 21 which is inclosed within the hems 18, 19 and the loops 22, 23 of which are adapted to be extended to engage the braces which connect the front bow of the top with the upper portion of the wind shield standard. These braces as illustrated herein may be in the form commonly used in certain automobiles which comprise strips 24 secured to the front bow of the top and provided with hooks 25 adapted to engage eyes 26 in the lateral extension 27 of the end of the standard 8, the straps 24 being so constructed as to be adjusted to stretch the top and maintain it in proper position. The resilient member 21 may however be engaged by any other suitable support which may be provided upon any particular type of machine and may be made in two parts suitably secured to the weather shield or if desired other forms of resilient connection between the ends of the weather strip and the stays or other supporting devices may be provided.

While I have described a preferred form of my invention it is to be understood that it may be embodied in other forms within the spirit and scope of the following claims.

Having thus described my invention what I claim as new and desire to secure by Letters Patent is:

1. In combination with a vehicle having a top, a wind shield and stays extending upwardly at the sides of the wind shield and anchored to the top; a weather shield comprising a strip of flexible material secured at its upper edge to one of the bows of the top and having a bifurcated lower portion embracing the upper edge of the wind shield and longitudinal elastic means extending from the ends of said bifurcated portions and embracing said stays whereby the weather shield is yieldingly but firmly clamped to said wind shield.

2. In combination with a vehicle having a top, a wind shield and stays extending upwardly at the sides of the wind shield and anchored to the top; a weather shield comprising a strip of flexible material folded longitudinally to present two flaps, said weather shield being secured along said fold to one of the bows of the top of said vehicle, the lower edges of said flaps being hemmed, an endless elastic spiral inclosed within said hems extending beyond the ends of said weather shield and embracing said stays.

3. A weather shield for vehicles comprising a strip of flexible material folded longitudinally to present two flaps, said flaps being secured together at a distance from the lower edge thereof to provide a bifurcated lower portion adapted to embrace the top of the wind shield, the lower edges of said flaps being hemmed and an endless wire spiral within said hems adapted to be extended beyond the edge thereof to engage suitable retaining means whereby the weather shield may be yieldingly clamped to the wind shield.

In testimony whereof, I have signed my name to this specification.

ARTHUR H. KINDER.

Copies of this patent may be obtained for five cents each, by addressing the "Commissioner of Patents, Washington, D. C."